United States Patent [19]

Hepworth et al.

[11] 3,979,732
[45] Sept. 7, 1976

[54] ASYNCHRONOUS STATUS INTERLOCK CIRCUIT FOR INTERFACE ADAPTOR

[75] Inventors: Edward C. Hepworth, Apache Junction; Rodney J. Means, Tempe, both of Ariz.

[73] Assignee: Motorola, Inc., Chicago, Ill.

[22] Filed: Feb. 18, 1975

[21] Appl. No.: 550,883

[52] U.S. Cl. .................. 340/172.5; 340/147 LP; 307/DIG. 1; 307/232; 328/109
[51] Int. Cl.² ................ H03K 5/20; H03K 5/153
[58] Field of Search ............ 340/172.5, 147 LP; 307/232, DIG. 1; 328/109

[56] References Cited
UNITED STATES PATENTS

| | | | |
|---|---|---|---|
| 3,452,330 | 6/1969 | Avery | 340/172.5 |
| 3,639,911 | 2/1972 | Frieband | 340/172.5 |
| 3,879,582 | 4/1975 | White | 340/172.5 |

*Primary Examiner*—Gareth D. Shaw
*Assistant Examiner*—James D. Thomas
*Attorney, Agent, or Firm*—Harry M. Weiss; Charles R. Hoffman

[57] ABSTRACT

An asynchronous interlock circuit for an interface adaptor circuit in a digital system includes a D-type latch, a D-type flip-flop, and an RS-type flip-flop interconnected to accept a peripheral status input from a peripheral equipment unit, a read status input and a read data input derived from control and selection inputs to the interface adaptor from a microprocessor unit of the digital system. The asynchronous interlock circuit stores information corresponding to a logical "1" on the peripheral status interrupt input in the D-type flip-flop, even if the latter signal disappears prior to acknowledgment by the microprocessor of a corresponding interrupt signal generated by the interface adaptor circuit. The D-type flip-flop is reset by a sequence of a read status signal and a read data signal, thereby avoiding problems which could arise if the peripheral status input remains at a logical "1" even after acknowledgment by the microprocessor unit of an interrupt signal generated by the interface adaptor. If a status change occurs on the peripheral status input while status is being read, the D-type latch is inhibited and the status change is not accepted until the read status operation is complete.

11 Claims, 4 Drawing Figures

FIG. I

ASYNCHRONOUS STATUS INTERLOCK CIRCUIT FOR INTERFACE ADAPTOR

RELATED APPLICATIONS

This application is related to assignee's copending U.S. patent application Ser. No. 519,138 "Interface Adaptor Architecture", Ser. No. 519,150 "Microprocessor Architecture", and Ser. No. 519,149 "Microprocessor System" by Bennett et al., all filed on Oct. 30, 1974, and to assignee's copending U.S. patent applications, "Asynchronous Communications Interface Adaptor", Ser. No. 550,336, "Logic Circuitry for Selection of Dedicated Registers", Ser. No. 550,338, "Interrupt Status Indication Logic for Polled Interrupt Digital System", Ser. No. 550,340, and "Digital System with Peripheral Control of Interface Adaptor", Ser. No. 550,311, all by Hepworth et. al.

BACKGROUND OF THE INVENTION

A large number of minicomputers are presently available. More recently, microcomputers utilizing bidirectional data busses have become available. A variety of specialized circuits in integrated circuit form have been utilized to interface between such bidirectional data busses and a variety of peripheral devices controlled by and interacting with microcomputers, such as, keyboards, printers, control displays, readers, plotters, etc. Circuits have also been provided to interface between bidirectional data busses and modems (modulator-demodulator) to allow the microcomputer to control remote equipment over a telephone line by converting data in a parallel word format to a serial word format, supplying signals representing the serial word format to a modem which sends data over a telephone line. Such modem circuits also receive data in a serial format from a telephone line, and transfer the data to an adaptor circuit which changes the data from the serial word format to a parallel word format and write it onto the bidirectional data bus.

The MOS (metal-oxide-semiconductor) technology has been utilized to provide a microcomputer using microprocessor unit chips (MPU's) integrated on a single semiconductor chip. Integrated circuit random access memory chips (RAM) and read only memory (ROM) chips and suitable interface adaptor chips for coupling the bidirectional data bus to peripheral equipment have also been provided by the MOS technology. Thereby, the power of computer data processing is made available at very low cost for use in a wide variety of industrial communications equipment. However, to take advantage of such low cost microcomputer systems to the fullest extent, it is often necessary to provide an efficient means of interfacing between the system data bus and peripheral devices which transmit and receive data asynchronously.

In the past, in order to permit communication between a bidirectional data bus and, for example, a modem, integrated circuits capable of providing both serial-to-parallel conversion for a receiving section thereof and parallel-to-serial conversion for a transmitting section thereof on a single chip, along with formatting circuitry have been utilized. It has been necessary to provide additional complex bus interface circuitry, separate from said chip, which is capable of receiving data from and transmitting data onto the bidirectional data bus and accepting or receiving data from said chip. This has required additional semiconductor packages, lower component density of the final product, and consequently higher costs.

SUMMARY OF THE INVENTION

It is an object of this invention to provide a low cost interlock circuit for an integrated circuit interface adaptor for communicating with a bidirectional data bus of a digital system.

Briefly described, the invention is an asynchronous status interlock circuit including a first storage circuit coupled to a peripheral input conductor for inhibiting a status change on the peripheral status input conductor during a read operation. The first storage circuit is coupled to a second storage circuit having an input connected to a read status conductor for storing a state representative of a transition on the peripheral status input until a read status operation and a read data operation are completed.

DESCRIPTION OF THE INVENTION

Figure 1:
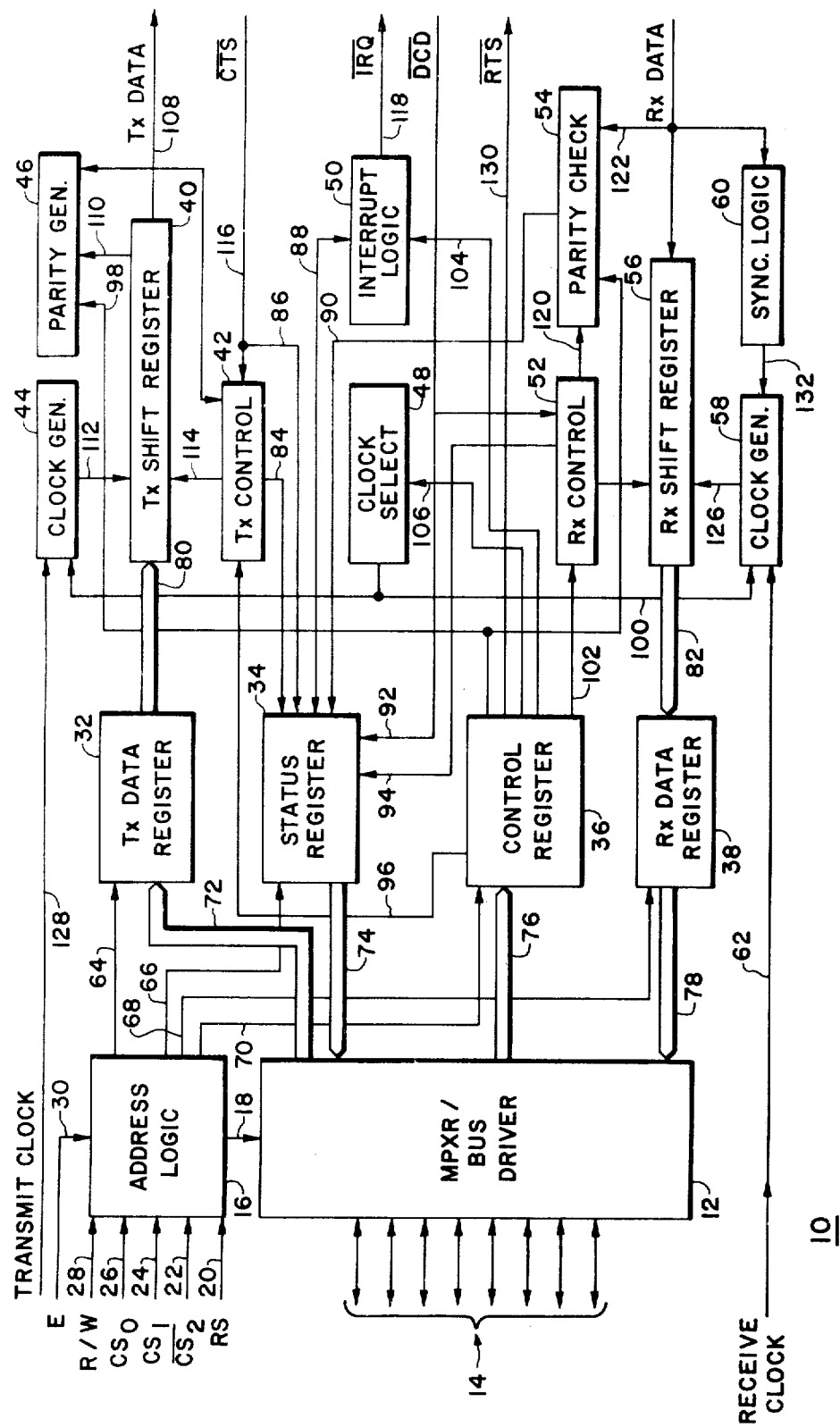
FIG. 1 is a block diagram of an asynchronous communications interface adaptor chip according to a presently preferred embodiment of the invention.

FIG. 1 is a block diagram of an integrated circuit version of an asynchronous interface adaptor (ACIA) circuit according to the invention. ACIA chip 10 has eight bidirectional data input/output lines forming a bidirectional data bus 14 connected to multiplexor (MPXR) bus driver circuitry 12 of ACIA chip 10. Enable (E) input 30, read/write (R/W) input 28, chip select inputs 26, 24, and 22 (also designated, respectively by $CS_0$ $CS_1$, and $\overline{CS_2}$) and register select (RS) input 20 are all connected to address logic circuitry 16 which is coupled to multiplexor bus driver circuitry 12 (referred to hereinafter as buffer circuitry 12) by means of one or more connections 18. In FIG. 1 the arrows indicate the usual direction of signal or data flow to or from a particular block of circuitry. Some of the solid lines are to be understood to represent a single conductor, while others may represent a plurality of separate conductors. The wide coupling elements such as by 72, 74, 76, 78, etc., represent buses which may include, for example, eight conductors for a one byte word system. The pointed ends of the buses indicate the direction of data flow and the same general format as exists and when the data received or driven by bidirectional data bus 14.

ACIA chip 10 includes four internal registers, including transmit data register 32, (designated TX Data Register in FIG. 1) receive data register 38 (designated RX Data Register in FIG. 1), control register 36, and status register 34. Address logic 16 causes one of the above mentioned registers to be selected, via connections 64, 66, 68, and 70, which are also connected, respectively, to transmit data register 32, status register 34, control register 36, and receive data register 38. Transmit data register 32 is coupled to buffer circuitry 12 by means of bus 72. Status register 34 is coupled to buffer circuitry 12 by means of bus 74. Control register 36 is coupled to buffer circuitry 12 by means of bus 76. Receive data register 38 is coupled to buffer circuitry 12 by bus 78.

Transmit data register 32, which is a write only register, is connected by means of bus 80 to transmit shift register 40. Data in transmit data register 32 is shifted in parallel to shift register 40 and transmitted onto transmit data line 108 (designated TX Data) in serial format, in accordance with a clock signal being supplied on conductor 112 connected to transmit shift register 40 and to clock generator 44. The clock signal on conductor 112 is derived from input transmit clock 128. The divide ratio between the signal on conductor 128 and the signal on conductor 112 is determined by an internal control signal on conductor 100, which is connected to clock generator 44, clock generator 58, and clock select circuit 48. Parity generator circuit 46 is connected to transmit shift register 40 by means of a plurality of conductors 110 and is also connected to control register 36 by means of conductor 98. Parity generator 46 and transmitter control circuit 42 are coupled by conductor 43. Receive data register 38 is connected to receive shift register 56 by data bus 82. Data applied in serial form on receive data conductor 122 (designated RX Data), which is coupled to sync logic circuit 60 and and receive shift register 56, is loaded into receive shift register 56 into a serial format at a rate determined by a signal generated by clock generator 58 and applied to receive shift register 56 by means of conductor 126. The data is then shifted in parallel by means of bus 82 to receive data register 38.

Control register 36 stores and controls signals which control the various data transfers occurring in ACIA chip 10, and is connected to request-to-send ($\overline{RTS}$) conductor 130, and is also connected to clock select circuitry 48 by means of conductor 106, and to interrupt logic circuitry 50 by means of conductor 104, and to receive control circuit 52 by means of conductor 102, and to transmit control circuit 42 by conductor 96.

Receiver control circuit 52 is connected to parity check circuit 54 by means of conductor 120, which is connected to control register 36 via conductor 98.

Status register 34 is, in a presently preferred embodiment of the invention, an eight bit register which stores information representative of the status of various conductors and circuits in ACIA chip 10. Status register 34 is connected to transmit control circuit 42 by means of conductor 84, clear to send ($\overline{CTS}$) conductor 116, by means of conductor 86. $\overline{CTS}$ is also connected to transmit control circuit 42. Status register 34 is connected to interrupt logic circuitry 50 by means of conductor 88, and to parity check circuit 54 by means of conductor 90 and to data carrier detect loss ($\overline{DCD}$) conductor 92 and to receiver control circuit 52 by means of conductor 94. Sync logic circuit 60 is connected to clock generator circuit by means of conductor 132. Transmit control circuit 42 is connected to status register 34 by conductor 84 and to control register 36 by conductor 96. Receiver control circuit 52 is connected to status register 34 by conductor 94 and to control register 36 by conductor 102.

Figure 2:
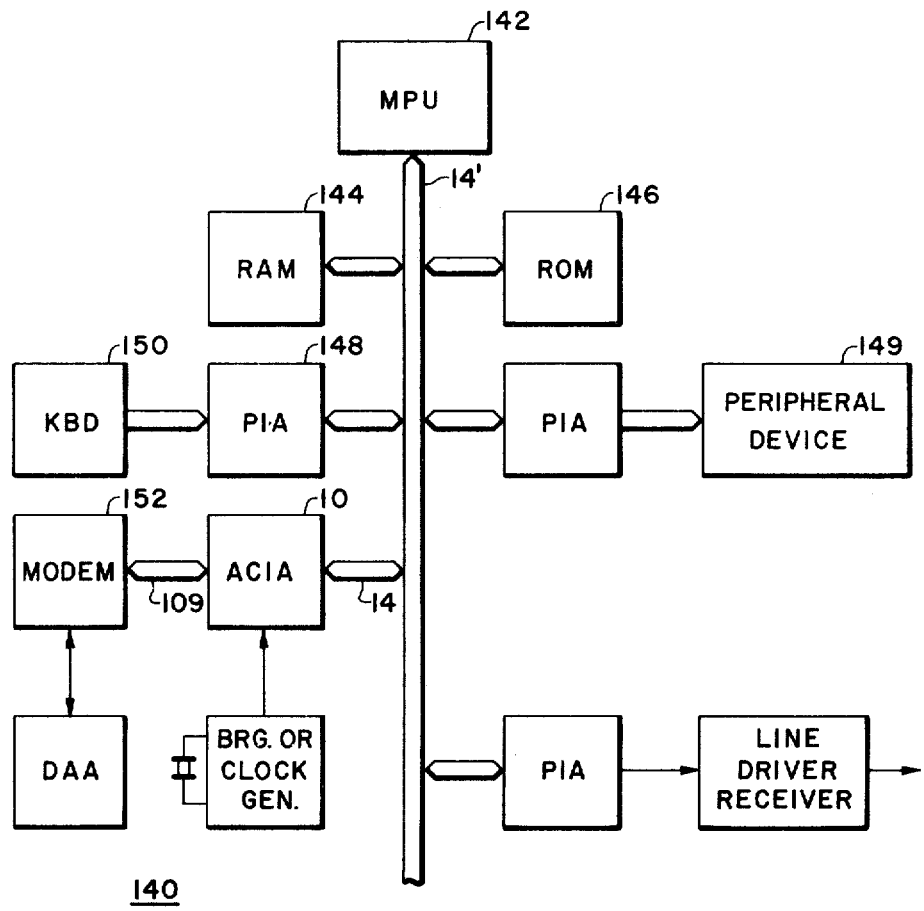
FIG. 2 is a block diagram of a microcomputer system in which the asynchronous communications interface adaptor of FIG. 1 may be utilized.

FIG. 2 is a block diagram of a typical microcomputer system in which the presently preferred embodiment of the asynchronous communications interface adaptor may be utilized. Microcomputer 140 includes microprocessor chip 142, which may be as described in the above mentioned U.S. patent application Ser. No. 519,150. Microprocessor circuit 142 is connected to a bidirectional data bus 14'. Random access memory (RAM) 144 and read only memory (ROM) 146 are connected, respectively, by means of their data bus lines, to the data conductors which constitute bidirectional data bus 14'. A plurality of peripheral interface adaptor chips 148 are connected by means of their bidirectional data input output conductors to the respective conductors of data bus 14'. (It will be understood that chips 142, 148, 10, etc. may be packaged in suitable semiconductor packages, such as dual-in-line packages). An exemplary peripheral interface adaptor is described in detail in copending U.S. patent application Ser. No. 519,138 mentioned above. A peripheral interface adaptor unit such as 148 may be utilized to couple peripheral devices such as key board 150 to data bus 14' to allow microprocessor 142 to communicate therewith. Peripheral interface adaptors may also be used to couple other peripheral devices, such as teletypes, (TTY), cathode ray tubes (CRT), control panels, cassettes, etc., designated in FIG. 2 by reference numeral 149.

ACIA chip 10, as shown in FIG. 1, may be connected by means of data bus 14 to microcomputer data bus 14'. A modem 152 may be connected to conductors 109, which may perform the functions of receiving data, transmitting data, and modem control.

Figure 3:
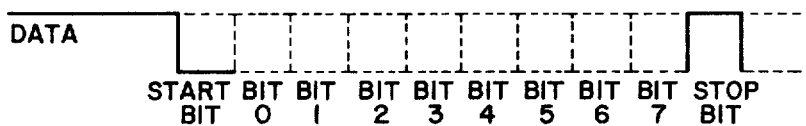
FIG. 3 is a diagram of a serial data word format and is useful in explaining the invention.

An asynchronous communications interface adaptor according to the invention provides the communications data formatting function as well as the means for controlling a modem or other communications peripheral. It provides the required address and internal register selection logic circuitry, chip enable logic circuitry, control (R/W) logic circuitry and bus interface logic for compatibility with a microprocessing unit (MPU) chip. The ACIA performs three distinct functions: asynchronous data transmission, asynchronous data reception, and limited modem control. In a presently preferred embodiment the ACIA according to the invention provides the capability to transmit and receive eight-bit or nine-bit words including optional parity bits, plus associated start and stop bits. FIG. 3 shows the serial word format including start and stop bits. Parity bits, not shown, may be inserted. A preferred design provides for separate data rates for transmitting and receiving.

ACIA chip 10 has an interrupt circuit 50 which acts on internal signals derived from three independent sources, the transmitter section, the receiver section, and the modem control interface section. The transmit data register 32 being empty will cause such an internal interrupt signal. The interrupt logic 50 is automatically reset by loading the transmitter data register from the buffer 12. The receive data register 38 being full (i.e., containing a character, i.e., word) will cause an internal interrupt signal to be generated by status register 34 on conductor 88 which will automatically be reset when received data is read, i.e., loaded by ACIA chip 10 onto bidirectional data bus 14 when R/W conductor 28 is at a logical 1. A loss of data carrier ($\overline{DCD}$ going high) will cause bit of status register 34 to be set, and causes the receiver section to be reset. The interrupt caused by $\overline{DCD}$ will be cleared when the status and receiver data register are read. The $\overline{DCD}$ status bit will be cleared when both the $\overline{DCD}$ input returns to a low level and the status and receiver data register has been read. A bus-controllable internal reset function, which is part of the control logic 36, is provided which resets the status buffer, clears the transmitter and receiver shift registers, and resets all counters and control logic. In addition, an automatic power-on reset system gives start-up protection until the normal bus controlled master reset is utilized during initialization. The power-on reset circuit is cleared by the bus controlled master reset function and associated circuitry.

The functional operation of the ACIA chip 10 is as follows: ACIA chip 10 consists of three-state bus drivers and receivers and multiplexers and in section 12 of FIG. 1, and also includes selection or address logic 16, parity logic 46 and 54, a parallel-to-serial converter including transmit data register 32 and transmit shift register 40, a serial-to-parallel converter including receive shift register 56 and receive data register 38.

Since ACIA chip 10 may be interfaced to a microprocessing unit, as in FIG. 2, the awareness of the following information is necessary. In a preferred embodiment, the MPU utilizes a 16 bit memory address register and address bus (not shown). The data transfers are provided over an eight-bit bidirectional data bus 14'. The register select (RS) input 20 is utilized to select one of four internal ACIA register locations, i.e., 32, 34, 36, or 38 in conjunction with the R/W line 28. The ACIA chip 10 itself is selected by wire decoding three of the sixteen address lines of the microcomputer of FIG. 2 in addition to RS input 20. The R/W control line 28 determines the direction of the data flow on bidirectional data bus 14 and is used, in addition, to aid selection of the internal registers mentioned above while Enable (E) input 30 causes the input output buffers in buffer section 12 to be enabled.

The eight-bit data bus 14 is interfaced by three-state bus drivers and receivers in section 12. Chip 10 is selected when $CS_0$ and $CS_1$ are high and $\overline{CS_2}$ is low. The R/W line causes the bus drivers to be activated by E when the MPU chip is undergoing a Read operation, for example, "reading" the ACIA chip 10 when R/W equals a logical 1, ACIA chip 10 being selected. Conversely, when the MPU is undergoing a write operation, R/W equals a logical 0, and the bus receiver circuits in section 12 are enabled. The register select (RS) input 20 selects the "data" registers (transmit data register 32 and receive data register 38 when RS equals a logical 1 and selects the status register 34 or the control register 36 when RS is equal to logical 0. The R/W line selects the "write only" registers, that is transmit data register 32 and control register 36 when R/W is at a logical 0 and selects the "read only" registers, received data register 38 and the status register 34 when R/W is equal to logical 1. The meaning of write only register is that such a register is only written into from the buffer section 12 and the bidirectional data bus 14, and is never read from such that the data is sent out on data bus 14; an analogous meaning is associated with the term read only register.

TABLE I

| Buffer Address | $RS \cdot \overline{R/W}$ | $RS \cdot R/W$ | $\overline{RS} \cdot \overline{R/W}$ | $\overline{RS} \cdot RW$ |
|---|---|---|---|---|
| Bus Line Number | Transmit Data Register (Write Only) | Receiver Data Register (Read Only) | Control Register (Write Only) | Status Register (Read Only) |
| 0 | Data Bit 0 | Data Bit 0 | Clk. Divide Sel. | Rx Data Rg. Full |
| 1 | Data Bit 1 | Data Bit 1 | Clk. Divide Sel. | Tx Data Reg. Empty |
| 2 | Data Bit 2 | Data Bit 2 | Word Sel. 1 | Data Carrier Det. loss |
| 3 | Data Bit 3 | Data Bit 3 | Word Sel. 2 | Clear to Send |
| 4 | Data Bit 4 | Data Bit 4 | Word Sel. 3 | Framing Error |
| 5 | Data Bit 5 | Data Bit 5 | Tx Control 1 | Overrun (OVRN) |
| 6 | Data Bit 6 | Data Bit 6 | Tx Control 2 | Parity Error (PE) |
| 7 | Data Bit 7 | Data Bit 7 | Rx Interrupt Enable | Interrupt Request |

Table 1 defines the functions of the transmit data register 32, the receive data register 38, the control register 36, and the status register 34 for a presently preferred embodiment of the invention. The combinations of the RS and R/W inputs required to select each of the registers are indicated in the "Buffer Address" row of table 1. The "Bus Line Number" designations refer to the conductors of bidirectional data bus 14 and the corresponding bits of the four abovementioned internal registers. Bits 0 and 1 of control register 36 are dedicated to selecting one of three divide clock ratios and to establishing a master reset function which resets all of the logic on the chip. Bits 2, 3 and 4 of control register 36 are dedicated to selecting one of eight different combinations of data word lengths, parity bits, and stop bits. Bits 5 and 6 of control register 36 control the "transmitter buffer empty" interrupt output, the state of the request-to-send ($\overline{RTS}$) output and the transmission of a "Break" level (i.e., space). Bit 7 of the control register controls interrupts being caused by the "receiver data register full" indicator and by $\overline{DCD}$. It should be noted that writing data into the transmit data register 32 causes the "transmit data empty" bit in status register 34 to go low and data can then be transmitted. Transfer of data therefrom causes the transmit data register empty bit to indicate empty. Upon receiving a complete character, data is automatically transferred to the empty receive data register 38 from receive shift register 56, which event causes the receive data register full bit in status register 34 to go high, allowing data to be read through bidirectional data bus 14. The nondestructive read cycle causes the "receive data register full" bit to be cleared. When the receive data register 38 is full, the automatic transfer of data from the receive shift register 56 is inhibited so that the contents of receive data register 38 remains valid.

The transmitting sequence consists of reading the ACIA status register 34 either as a result of an interrupt signal from circuit 50 or in the ACIA's turn in a "polling" sequence by the MPU of circuits connected to bidirection data bus 14'. The transmitter data register empty status is determined, and when empty, the write sequence is initiated and a character is loaded into the transmit data register 32. As soon as the transmit shift register 40 is available, the character in the transmit data register 32 is serialized and transmitted from the transmit data output 108 along with a leading start bit and a trailing stop bit or bits inserted by transmitter control circuit 42. Parity (odd or even) can be optionally added to the character by circuit 46 and will occur between the last data bit and the first stop bit. The word length can range between eight and nine bits (including parity) plus the start and stop bits in a presently preferred embodiment of the invention. Parity, word length, number of stop bits (one or two), clock divider ratio, and transmit interrupt enable can all be selected by means of the MPU bus 14; (under program control) and the ACIA control registers. A length of break (break is defined as all spaces in the serial word format, i.e., all logical 0's) can be programmed from the MPU data bus 14'. The control bit for the break character is set to initiate break and reset to terminate the space condition. The bit rate of transmission is determined at the transmit clock frequency applied to line 128 and the clock divider select state as determined by the state of the first two control register bits.

Data is received by means of the receive data input 122. The leading mark-to-space transition (i.e., 1 to 0 transition) of the start bit synchronizes the internal clock generator with the timing of the data being received by means of sync (i.e., synchronizing) logic 60. False start bit deletion will insure against synchronizing on noise by insuring that a full one-half bit of the start time frame has been received before synchronizing to the bit time occurs. Two divide ratios are available in a presently preferred embodiment for purposes of bit synchronization. These are 16 and 64, the latter being for higher precision. The clock will be automatically synchronized to the theoretical data midpoint. When the character reception is complete, the character (word) will be automatically loaded into the receive data register 38 if it is empty. As the characters are being received, parity will be checked and the error indication, if any, will be available in the status register 34 which contains the following information. First, a framing error indicates the absence of the stop bit. Second, an overrun error indicates one or more characters have been lost. Third, the receive data register full indicator indicates a character has been received and is available for the MPU. Fourth, the parity error bit of status register 34 indicates the number of mark bits does not agree with the even or odd parity selected. The parity bit is stripped from the data being transferred to receiver data register 38 and in the case of a seven bit word, the eighth bit will be low.

When data is transferred into the receive data register 38, the receive data register full bit of status register 34 is set and an interrupt is initiated, assuming the receiver interrupt is enabled. The MPU will then read the ACIA status register 34 to determine the source of the internal interrupt signal and whether the character is valid. The receive data register full status bit will indicate that the receive data register 38 is full and MPU chip 142 will subsequently read the receive data register 38. The interrupt and receive data register full status bit will then be reset automatically. Parity, word length, and interrupt enable are programmed via the microprocessor control bus 14' and control register 36.

If the received data register full status bit indicates receive data register 38 is full when the incoming character is complete and ready to be transferred to receive data register 38, the transfer will be inhibited and an overrun indication will be stored in an internal overrun flip-flop. When the receive data register 38 is read, transferring the last good character prior to overrunning to the bus 14, the internal overrun indication is transferred to the status register 34 and the receive data register full status bit is set. The next successive reading of the receiver data register 38 will clear the overrun status bit unless an additional overrun has occurred in the meantime.

An asynchronous status interlock circuit for an interface adaptor according to the invention is described with reference to FIG. 4.

Figure 4:
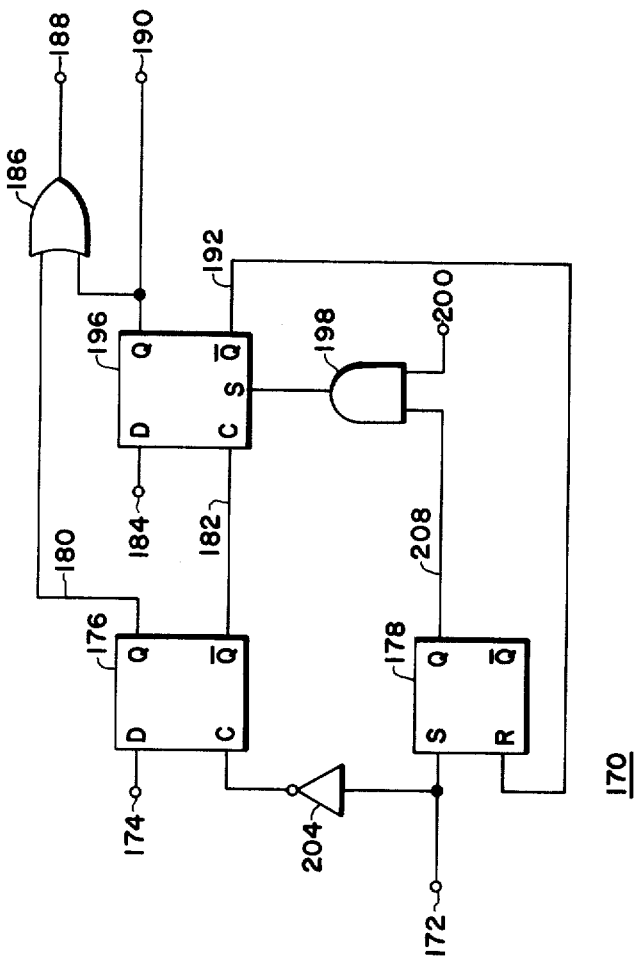
FIG. 4 is a diagram showing a logic diagram of an asynchronous status circuit for the system of FIG. 1 according to the invention.

Referring to FIG. 4, asynchronous status interlock circuit 170 includes D-type latch 176, RS flip-flop 178, and D-type flip-flop 196. D-type latch 176 has its input connected to peripheral status input conductor 174 and has its clock input connected to conductor 206 which is connected to the output of inverter 204. A Q output 180 of D-type latch 176 is connected to an input of OR gate 186, which has its output connected to status output conductor 188. The complement output 182 of D-type latch 176 is connected to a clock input of D-type flip-flop 196, which has its input connected to node 184, which is a source of a logical 1 level. The Q output of D-type flip-flop 196 is connected to interrupt output conductor 190 and also to the other input of OR gate 186. The Q output of D-type flip-flop 196 is connected to conductor 192 which is connected to the reset input of RS flip-flop 178. The set input of RS flip-flop 178 is connected to read status conductor 172, which is also connected to the input of inverter 204. A Q output of RS flip-flop 178 is connected to conductor 208, which is connected to one input of AND gate 198, which has its other input connected to read data conductor 200 and has its output connected to the direct set input of D-type flip-flop 196 via conductor 194. In varying circuit implementations of the invention, of course it will be recognized that AND gate 198 may in practice be a NAND gate and OR gate 186 may be a NOR gate.

Several problems arise when tha ACIA chip 10 must interpret asynchronous status changes from the associated peripheral device. First, a peripheral status change on peripheral status input 174 may occur, cause an interrupt, and then the logic level causing the interrupt may disappear before MPU chip 142 (FIG. 2) has time to acknowledge that interrupt. Secondly, a peripheral status change may occur, cause an interrupt signal, which is acknowledged by MPU chip 142 (by means of an interrupt routine) and the logic level on the peripheral status line 174 may continue so as to interrupt MPU chip 142 after acknowledgment. Thirdly, the status of a peripheral device could change as the MPU subroutine is causing status to be read, leading to a situation in which the correct status is not correctly interpreted.

These problems are resolved by the asynchronous status interlock system according to the invention.

Still referring to FIG. 4, if a peripheral status change occurs which should cause an interrupt and status indication, and the read status operation is not being performed, the D-type latch 176, and consequently the D-type flip-flop 196 are set, storing the information corresponding to the status change. The status output 188 and interrupt output 190 are then at a logical 1 level. If a status change occurs while status is being read, the D-type latch 176 is inhibited and a status change is not accepted until the read operation (via read status input 172) is complete; this solves the third problem mentioned above.

In order to clear the logic circuitry 170 after detecting the interrupt the MPU chip 142 must generate a read status operation, which results in the RS flip-flop 178 being set, and subsequently must generate a read data operation. This resets the D-type flip-flop 196, and the interrupt output 190 goes to a logical zero, which prevents the circuitry in FIG. 4 from indicating another interrupt condition, which solves a second problem mentioned above. The peripheral status input 174 could still be at a logical 1, and thus the status output 188 would be also still at a logical 1.

However, if an interrupt condition had occurred and then disappeared before the MPU 142 had an opportunity to acknowledge that interrupt condition, corresponding information is stored in the D-type flip-flop 196 until the microprocessor has instituted a read status and a read data operation, thereby solving the first above mentioned problem.

While the invention has been described in relation to a presently preferred embodiment thereof, those skilled in the art will recognize that variations in arrangement and placement of parts may be made within the scope of the invention to suit various requirements.

What is claimed is:

1. In an interface adaptor suitable for being coupled between a bidirectional data bus of a digital system and a peripheral unit for interacting with said digital system, an asynchronous interlock circuit comprising:
   a D-type latch circuit having its input connected to a peripheral status input;
   a D-type flip-flop having its input coupled to a conductor for applying a logical 1 thereto and having an output coupled to an interrupt output conductor of said interface adaptor;
   and RS-type flip-flop having its set input connected to a read status input conductor and having its reset input connected to a complement output of said D-type flip-flop;
   an inverter having its input connected to said read status conductor and having its output connected to a clock input of said D-type latch;
   a logic gate having one input connected to the output of said RS-type flip-flop and having another input connected to a read data conductor and having an output connected to a reset input of said D-type flip-flop; and
   a second gate having an output connected to a status output conductor, one input connected to said output of said D-type flip-flop and another input connected to an output of said D-type latch.

2. A asynchronous interlock circuit as recited in claim 1 wherein said logic gate is an AND-type gate.

3. The asynchronous interlock circuit as recited in claim 1 wherein said second gate is an OR-type gate.

4. An asynchronous status interlock circuit comprising:
   a peripheral status input conductor for conducting a status change signal;
   a read status conductor for conducting a read status signal;
   a read data conductor for conducting a read data signal representative of a read data operation; and
   first clocked storage circuit means coupled to said peripheral status input conductor for inhibiting said status change signal during said read status signal while storing a prior state representative of a prior status change signal;
   second storage means coupled to an output of said first storage means for storing information representative of said status change signal after said read status signal has occurred; and
   third storage circuit means coupled to said read data conductor and said first clocked storage circuit means and said second storage circuit means for storing information indicative of whether said read status signal has occurred conditioned on the event that said second storage means has been reset responsive to said read data signal.

5. The asynchronous status interlock circuit as recited in claim 4 further comprising a logic gate having an output coupled to a reset input of said second storage means and having input coupled, respectively, to an output of said third storage means and said read data conductor, said logic gate performing the function of resetting said second storage means in response to said read data signal on the condition that said third storage circuit means contains information indicating that said read status signal has occurred.

6. The asynchronous status interlock circuit as recited in claim 5 further including an inverter coupled between a set input of said third storage means and a clock input of said first storage means.

7. The asynchronous status interlock circuit as recited in claim 5 wherein said first storage circuit means comprises a D-type latch having a D input coupled to said peripheral status input conductor.

8. The asynchronous status interlock circuit as recited in claim 7 wherein said second storage means is a D-type flip-flop having a D input coupled to a conductor adapted to having a logical 1 applied thereto and having a clock input coupled to a $\overline{Q}$ output of said D-type latch.

9. The asynchronous status interlock circuit as recited is claim 8 wherein said third storage circuit means is an RS flip-flop having its R input connected to a read status conductor also connected to an input of an inverter having an output connected to a clock input of said D-type latch, said RS flip-flop having its S input connected to a $\overline{Q}$ output of said D-type flip-flop, and having its Q output connected to an input of an AND-type gate having its output connected to a direct set input of said D-type flip-flop.

10. The asynchronous status interlock circuit as recited in claim 9 further including a read data conductor connected to another input of said AND-type gate.

11. A method of operating an asynchronous status interlock circuit including a first storage circuit coupled to a peripheral input conductor, a second storage circuit coupled to an output of said first storage circuit, and a third storage circuit coupled to said first and second storage circuits comprising the steps of:
   inhibiting a voltage transition of said peripheral status input conductor from being stored in said first storage circuit while storing a prior state representative of a prior transition of said peripheral status input conductor in said first storage circuit, said inhibiting taking place during a read status operation;

transferring information representing a status change on said peripheral status input conductor to said second storage circuit by transferring said information through said first storage circuit to said second storage circuit after said read status operation; and storing information representative of occurrence of a read status operation in said third storage means and utilizing said information in said third storage means to enable a signal on a read data conductor to reset said second storage means during a read data operation.

* * * * *

UNITED STATES PATENT AND TRADEMARK OFFICE
CERTIFICATE OF CORRECTION

PATENT NO. : 3,979,732
DATED : September 7, 1976
INVENTOR(S) : Edward C. Hepworth and Rodney J. Means It is certified that error appears in the above—identified patent and that said Letters Patent are hereby corrected as shown below:

In Figure 4, change the "S" input of D-type flip-flop 196 to --R--.

In Column 8, line 33, change "Q" to --$\overline{Q}$--.

In column 8, line 42, change "set" to --reset--.

Signed and Sealed this

Seventh Day of July 1981

[SEAL]

Attest:

RENE D. TEGTMEYER

*Attesting Officer*   *Acting Commissioner of Patents and Trademarks*